United States Patent Office 2,700,024
Patented Jan. 18, 1955

2,700,024

PROCESS OF BREAKING EMULSIONS

William B. Hughes and Everett B. Fisher, Bartlesville, Okla., assignors to Cities Service Research and Development Company, New York, N. Y., a corporation of New Jersey No Drawing. Application January 4, 1951,
Serial No. 204,471

6 Claims. (Cl. 252—341)

This invention relates to surface active compounds and more particularly to compounds effective to break certain water-in-oil emulsions of the type met with in crude oil production.

One of the most troublesome problems met with in crude oil production relates to the breaking of water-in-oil emulsions formed in wells producing both oil and brine. These emulsions are generally of two types, the first type being a mechanically cut emulsion, which is usually formed in the well by faulty pumping equipment, the other type being a gas-cut emulsion, the formation of which is aided by the emulsifying action of certain asphaltenes and other chemical emulsifiers occurring naturally in the crude oil. The emulsion commonly encountered is a mixture of both of these types and its properties will vary from well to well, and even from day to day in the same well. Unless these emulsions can be effectively and completely broken, the oil content is lost.

There are apparently two phases of an emulsion resolving problem. The first involves a surface phenomenon in which the oil film surrounding the water particles of micron size is weakened, allowing the particles to coalesce into larger droplets; this phase will be hereinafter referred to as the emulsion breaking step. The other involves a splitting of the broken emulsion into separate oil and water phases, and will be referred to as the water separation step.

It has been found that emulsion breakers described in the prior art, and available commercially, are generally effective in breaking a wide variety of emulsions, but may be ineffective in breaking certain emulsions which may be termed refractory emulsions in that they are highly resistant to demulsifiers commonly used in the oil fields. The reason for the abnormality of these emulsions is not known, but may be due to the fact that the natural emulsifiers occurring in the crude oil are of a type not commonly found, and are resistant to the action of chemical demulsifiers effective against emulsifiers more ordinarily encountered. In order to satisfactorily break these emulsions it is often necessary to resort to physical treatments such as subjecting the emulsion to the action of high tension electric fields in order to induce coalescence of the water particles. Equipment for so treating the emulsion is costly, and presents many problems of upkeep and maintenance not encountered in the chemical methods of treating emulsions.

In this specification, and in the appended claims, it is to be understood that by "refractory emulsions" we intend to refer to emulsions which are highly resistant to the action of chemical demulsifiers of the type which are effective against the more commonly encountered water-in-crude-oil emulsions, but which may be easily broken by the action of the new chemical demulsifiers hereinafter disclosed.

We have discovered a series of compounds which have been found to be highly successful in breaking refractory emulsions. Strangely enough, the compounds show little or no breaking action on emulsions which are easily broken by the use of the more commonly used emulsion breakers. They also exhibit poor water separation characteristics, so that in order to obtain a composition which will completely and rapidly resolve a refractory emulsion, it is advisable to blend the new compounds with an agent effective to cause rapid water separation. Typical of such agents are the compounds disclosed in copending applications of William B. Hughes Serial No. 141,597 filed January 31, 1950 which issued as Patent 2,646,405 on July 21, 1953 and Serial No. 144,595 filed February 16, 1950 on which Patent 2,646,406 issued on July 21, 1953.

In general our new compounds may be prepared by reacting two mols of a primary amine and one mol of an aldehyde to form an intermediate product. The reaction product appears to be a mixture of a large number of unidentified compounds. Attempts have been made to isolate pure products by fractionation of the mixture, but no appreciable flats could be found in the distillation curve. Various cuts were taken and further reacted as described hereinafter in an attempt to discover whether the higher-boiling cuts were more effective than the lower boiling cuts or vice versa. It was found, however, that there was not much, if any variation in effectiveness, and for this reason we prefer to utilize the crude reaction mixture, thus avoiding the needless expense and trouble involved in effecting the recovery of pure compounds. This reaction commences spontaneously upon mixing the materials, and will normally go to completion at atmospheric temperatures within a few hours. We have found it desirable, however, to heat the mixture in order to speed up the reaction and to insure that it goes to completion. When heated to about 100° C., the reaction is ordinarily complete within about one-half hour. The product, an oily liquid, may then be separated from the water formed in the reaction by any suitable methods, such as centrifuging or decanting.

The intermediate product is then neutralized to a pH of about 3.5 by the reaction product of a polybasic acid or its anhydride and castor oil, the acid being used in such proportions that the reaction product contains free carboxyl radicals. When using dibasic acids, the preferred proportion is from about 2 to about 3 mols of acid per mol of castor oil. The reaction between the castor oil and the acid does not proceed spontaneously, and it is generally necessary to heat the reaction mass at 180° C. or thereabouts for about two hours in order to complete the reaction. The reaction is considered complete when titration of the product indicates that the acid has reacted with the castor oil in almost the theoretical amount, based on the proportion of ingredients used.

Any readily available aldehyde may be used, such as formaldehyde, acetaldehyde, propionaldehyde, butyraldehyde, heptaldehyde, or higher aldehydes. Formaldehyde is preferred, however, because of its high reactivity and low cost. Among the primary amines useful in formulating our new compounds may be included ethyl amine, amyl amine, octyl amine, or any other functionally equivalent amine. As the polybasic acid we prefer to use phthalic acid or its anhydride, but any other equivalent polybasic acid may be used.

In order that those skilled in the art may more fully appreciate the nature of our new compounds, and the method of preparing them, the following example is given.

Example

One hundred and seventy-four grams of monoamyl amine, and 30 grams of formaldehyde in aqueous solution were mixed and heated at about 100° C. for a period of one-half hour to form a first intermediate reaction product. This product, which formed an oily layer, was separated from the water layer by decantation.

A second intermediate reaction product was then prepared by heating one mol (985 g.) of castor oil with 2.5 mols (370 g.) of phthalic anhydride at 180° C. for a period of about two hours. The first intermediate was then neutralized with the second intermediate to a pH of 3.5 to form the final reaction product.

As stated above, the compounds disclosed herein, while effective to break refractory emulsions, in general show poor water separation characteristics. On occasion, however, emulsions will be formed on which the compounds show good water separation, in addition to good breaking action, so that the new compounds alone will resolve the emulsions in a satisfactory manner. In most cases, however, it is preferable, in order to effect rapid water separation from the broken emulsion, to mix the compounds with water separation agents in the proportion of from about 90 to 99 per cent of the new compounds to from about 1 to about 10 per cent of the water separation agent. While any agent which exhibits good water separation characteristics, regardless of any emulsion-breaking effects it exhibits, may be used, the products prepared by reacting at a temperature of about 180° C. and for a time of about two hours one mol of a glyceride of a hydroxy acid having more than 11 carbon atoms with from about 2 to about 3 mols of triethanolamine, neutralized to a methyl orange end-point with a long chain hydroxy acid such as hydroxystearic acid or hydroxy wax acids, as disclosed and described in copending application Serial No. 141,597 filed January 31, 1950, now Patent 2,646,405 issued on July 21, 1953, and the products prepared by neutralizing a heat polymerized basic hydroxy amine prepared by heating an alkanol amine, in the presence of about 1 percent sodium hydroxide, to a temperature of from about 225° C. to about 275° C. for a time sufficient to polymerize the amine to a heavy syrup or solid, to a methyl orange end-point with a long chain hydroxy acid such as ricinoleic acid, hydroxy stearic acid, hydroxy wax acids, or other low-chain hydroxy acids, as disclosed and described in copending application Serial No. 144,595 filed February 16, 1950, now Patent 2,646,406 issued on July 21, 1953, have proven particularly satisfactory.

Our new products also exhibit a synergistic effect when blended with compounds effective to break normal emulsions. Thus, tests of my new materials blended in 50-50 amounts with the amine-carbonyl-propylated naphthalene sulfonate breakers disclosed in our copending application Serial No. 198,915 filed December 2, 1950, now Patent 2,646,404 issued on July 21, 1953, showed that the blend was markedly more effective than the breaker alone, in some instances, the blend being at least three times as effective as the breaker alone,

Having now described our invention, what we claim as new and useful is:

1. The process of breaking emulsions which includes mixing with a petroleum water-in-oil emulsion a quantity of a dual component breaking agent comprising (1) an emulsion resolving agent formed by first reacting an aldehyde and a primary alkyl amine in the ratio of about one mol of aldehyde to two mols of amine to form a first intermediate product, then heating together one mol of castor oil and from about two to three mols of a dicarboxylic acid substance at about 180° C. for a period of about two hours to form a second intermediate product, and finally neutralizing the first intermediate product with the second intermediate product to a pH of about 3.5, and (2) a water separation agent effective to cause rapid water separation from a resolved emulsion, and selected from the group consisting of (a) compounds prepared by reacting one mol of a glyceride of a hydroxy acid having more than 11 carbon atoms to the molecule with from about 2 to about 3 mols of triethanolamine at a temperature of about 180° C. for a time of about two hours, and neutralizing the reaction product to a methyl orange end point with a long chain hydroxy acid, and (b) products prepared by neutralizing a heat polymerized basic hydroxy amine prepared by heating an alkanol amine in the presence of about 1 percent of sodium hydroxide to a temperature of about 225° C. for a time sufficient to polymerize the amine to a heavy syrup, to a methyl orange end point with a long chain hydroxy acid, the proportion of water separation agent present in the dual component breaking agent being from about 1 to about 10 percent, the said breaking agent being mixed with the emulsion in an amount small but sufficient to cause substantial resolution of the emulsion, allowing the emulsion to settle into an oil phase and a water phase, and separating the oil from the water.

2. The process according to claim 1 in which the water separation agent is a compound prepared by reacting one mol of a glyceride of a hydroxy acid having more than 11 carbon atoms to the molecule with from about 2 to about 3 mols of triethanolamine at a temperature of about 180° C. for a time of about two hours, and neutralizing the reaction product to a methyl orange end point with a long chain hydroxy acid.

3. The process according to claim 1 in which the water separation agent is a product prepared by neutralizing a heat polymerized basic hydroxy amine prepared by heating an alkanol amine, in the presence of about 1 percent sodium hydroxide to a temperature of about 225° C. to about 275° C. for a time sufficient to polymerize the amine to a heavy syrup, to a methyl orange end point with a long chain hydroxy acid.

4. The process of breaking emulsions which includes mixing with a petroleum water-in-oil emulsion a quantity of a dual component breaking agent comprising (1) the reaction product of one mol of formaldehyde and about two mols of amyl amine, neutralized to a pH of about 3.5 with a product prepared by heating one mol of castor oil and about 2.5 mols of phthalic anhydride at a temperature of about 180° C. for about two hours, and (2) a water separation agent effective to cause rapid water separation from a resolved emulsion, and selected from the group consisting of (a) compounds prepared by reacting one mol of a glyceride of a hydroxy acid having more than 11 carbon atoms to the molecule with from about 2 to about 3 mols of triethanolamine at a temperature of about 180° C. for a time of about two hours, and neutralizing the reaction product to a methyl orange end point with a long chain hydroxy acid, and (b) products prepared by neutralizing a heat polymerized basic hydroxy amine prepared by heating an alkanol amine in the presence of about 1 percent of sodium hydroxide to a temperature of about 225° C. to about 275° C. for a time sufficient to polymerize the amine to a heavy syrup, to a methyl orange end point with a long chain hydroxy acid, the proportion of water separation agent present in the dual component breaking agent being from about 1 to about 10 percent, the said breaking agent being mixed with the emulsion in an amount small but sufficient to cause substantial resolution of the emulsion, allowing the emulsion to settle into a water phase and an oil phase, and separating oil from the water.

5. The process according to claim 4 in which the water separation agent is a compound prepared by reacting one mol of a glyceride of a hydroxy acid having more than 11 carbon atoms to the molecule with from about 2 to about 3 mols of triethanolamine at a temperature of about 180° C. for a time of about two hours, and neutralizing the reaction product to a methyl orange end point with a long chain hydroxy acid.

6. The process according to claim 4 in which water separation agent is a product prepared by neutralizing a heat polymerized basic hydroxy amine to a methyl orange end point with a long chain hydroxy acid.

References Cited in the file of this patent

UNITED STATES PATENTS

| | | |
|---|---|---|
| 2,303,414 | Wayne | Dec. 1, 1942 |
| 2,440,349 | Schaeffer | Apr. 27, 1948 |
| 2,448,626 | Schaeffer | Sept. 7, 1948 |
| 2,491,478 | Cook et al. | Dec. 20, 1949 |